(12) United States Patent
Feder et al.

(10) Patent No.: US 6,438,899 B1
(45) Date of Patent: Aug. 27, 2002

(54) MOTOR VEHICLE DOOR

(75) Inventors: Roland Feder, Weitramsdorf; Stefan Burger, Ernstfeld; Sabine Neuss, Bamberg; Eberhard Pleiss, Untersiemau, all of (DE)

(73) Assignee: Brose Fahrzeugteile GmbH & Co. KG, Coburg (DE)

( * ) Notice: Subject to any disclaimer, the term of this patent is extended or adjusted under 35 U.S.C. 154(b) by 0 days.

(21) Appl. No.: 09/530,319

(22) PCT Filed: Oct. 29, 1998

(86) PCT No.: PCT/DE98/03208

§ 371 (c)(1),
(2), (4) Date: Apr. 28, 2000

(87) PCT Pub. No.: WO99/21728

PCT Pub. Date: May 6, 1999

(30) Foreign Application Priority Data

Oct. 29, 1997 (DE) ......................... 197 47 710

(51) Int. Cl.⁷ .................................. B60J 5/04
(52) U.S. Cl. ..................... 49/502; 296/146.7
(58) Field of Search ............ 49/502; 296/146.7, 296/146.5

(56) References Cited

U.S. PATENT DOCUMENTS

| | | | |
|---|---|---|---|
| 4,866,883 A | * 9/1989 | Brown et al. | 49/502 |
| 5,040,335 A | * 8/1991 | Grimes | 296/146.7 |
| 5,090,158 A | 2/1992 | Bertolini | 49/348 |
| 5,345,721 A | * 9/1994 | Stein et al. | 296/146.7 |
| 5,884,434 A | * 3/1999 | Dedrich et al. | 49/502 |
| 5,906,072 A | * 5/1999 | Feige et al. | 49/502 |
| 5,908,216 A | * 6/1999 | Townsend | 296/146.5 |

FOREIGN PATENT DOCUMENTS

| | | |
|---|---|---|
| DE | 25 10 220 A1 | 9/1976 |
| DE | 83 09 452.0 | 11/1986 |
| DE | 4 428 262 C1 | 1/1996 |
| EP | 0 243 325 | 10/1987 |
| FR | 2 626 534 | 8/1989 |
| GB | 2 117 329 A | 10/1983 |

* cited by examiner

*Primary Examiner*—Jerry Redman
(74) *Attorney, Agent, or Firm*—Christie, Parker & Hale, LLP

(57) ABSTRACT

A motor vehicle door having an outer door panel and an inner door panel provided with a large-surface cut-out section wherein the cut-out section is covered wholly or in part by a support plate and wherein the support plate supports mechanical and/or electrical components, such as a window lifter, lock, side airbag, electronics and electric cables, and having a door inside trim which closes the vehicle door from the interior of the vehicle. The support plate and at least one part of the door inside trim are formed as one structural unit which is made in one tool wherein the support plate and the part of the door inside trim are connected together so that they can be folded together.

26 Claims, 6 Drawing Sheets

MOTOR VEHICLE DOOR

FIELD OF THE INVENTION

The invention relates to a motor vehicle door having a support plate for mechanical and/or electrical components

BACKGROUND OF THE INVENTION

Support plates typically are made from metal, more particularly from a steel plate. The support plates additionally are made from plastics which are made by injection moulding. The support plate covers a part of a large cut-out surface area (or recess) in a door inside trim. Mechanical and electrical components prefitted thereon are tested and adjusted where necessary prior to installation in the vehicle door. In order to divide the door into a sufficiently demarcated wet cell and dry cell, the cut-out recess in the inside door panel is generally sealed in addition over a large surface area by a cover foil.

From DE 83 09 452 U 1, a motor vehicle door is known whose inner support structure has a large cut-out surface area section which is covered by a door inside trim. This door inside trim is provided with a flap which can be opened up when required to reveal a part of the large surface area cut-out section in the door so that assembly work can be undertaken through this cut-out section.

SUMMARY OF THE INVENTION

The object of the invention is to develop a motor vehicle door of the kind already mentioned still further so that its manufacture becomes more efficient and more cost-effective and at the same time the conditions for integrating the component parts which are to be prefitted into the motor vehicle door are improved.

According to this, the support plate and at least one part of the door inside trim are formed as one structural group which is made jointly in one tool wherein the support plate and the door inside trim are connected together for hinged movement through a connecting area made in this tool (at the same time).

In this way it is possible to form one structural unit which can be prefitted and pre-checked where applicable and which comprises, in addition to the support plate and a part of the door inside trim, also the function elements which are mounted on the support plate or door inside trim, such as for example a window lifter, a door lock, a speaker, a door control device, a side airbag and the like.

In a preferred embodiment of the invention, the support plate and the part of the door inside trim are made at least in part of plastics and are connected together by a hinge.

The support plate and the part of the door inside trim can be formed as injection moulded parts which are made together in one injection moulding tool, or can also be formed as blow-moulded parts formed on the basis of a tubular foundation body.

According to one variation of the invention, the support plate and the part of the door inside trim are formed as a one-piece unit. Plastics are particularly suitable when forming one integral unit comprising the support plate and door inside trim. Apart from the possibility of utilizing the injection moulding technique for manufacturing the one-piece component part comprising the support plate and door inside trim, the formation of this component part on the basis of a tubular foundation body in the form of a blow moulded part is particularly advantageous since the blow moulding technique can be applied in a very cost-effective manner and at the same time opens up numerous possibilities for design shaping. Furthermore the base material can be used to form a film hinge.

Utilizing the blow moulding technique to produce one unit comprising the support plate and door inside trim (or at least a part thereof) in the form of a substantially flat surface component part automatically leads to a double-walled element whose walls can be adapted in various areas with regard to the outer contour to the concrete requirements of each individual case. Furthermore it is possible to connect the walls together in spots, lines or over a large surface area in order to increase the stiffness of the support plate or to allow sealed apertures. By connecting together the opposing walls in part, it is also possible to produce several hollow cavities which are separated from each other and can be used for different purposes. The synergy effects, which are hereby produced, lead in particular to savings in the production and assembly costs as well as to a reduction in the weight of the vehicle door.

Particularly when the door plate and the part of the door inside trim form one integral structural unit, the hinge can advantageously be formed as a film hinge, wherein a hinge strip or woven part can also be provided which is connected to the marginal areas of the door plate and to the associated part of the door inside trim.

According to a further variation of the invention, the support plate and the part of the door inside trim are connected together through a rotary hinge. This can be made from separate hinge areas provided on the support plate on one side and on the part of the door inside trim on the other, with the two hinge areas being first made in one tool (more particularly an injection moulding tool) as a one-piece unit which can be separated into two hinge areas by breaking off the connecting elements.

This variation of the invention is also advantageous when the support plate and the door inside trim are to be made of different materials. Particularly suitable as materials for the support plate are metal plate, cast metal, injection moulded parts or blow moulded parts of plastics as well as pressed fibre materials of hemp, wood etc.

Furthermore according to the invention, detent elements can be moulded on the support plate and/or on a part of the door inside trim to allow the two parts, which are able to swivel about the hinge axis and thus fold onto each other, to be locked together. This allows safe secure handling during transport and assembly. This locking action can be released when necessary to allow servicing of the component parts and structural groups mounted on the support plate and covered by the door inside trim. When there is a need to replace the door inside trim, the door inside trim has to be separated from the support plate. To this end, the hinge connection between the support plate and the door inside trim should likewise be designed releasable, for example through the ability to be cut through, by means of an ideal break point or a tear line or other similar suitable technical means.

The door inside trim preferably only covers a part of the large surface area cut-out section in the inner door panel and keeps clear the spaces and surfaces required for the assembly work.

To simplify the guide of electric leads, it is possible to provide, on the support plate and door inside trim, associated contacts which when the support plate and door inside trim are folded together produce the necessary electrical connections. These electrical contacts can advantageously also be combined with the detent elements described above and thus at the same time undertake the positioning of the support plate and door inside trim relative to each other as well as their interlocking.

One important advantage of all the variations of the invention described above lies in providing one module which can comprise all the mechanical, electrical and electronic components of the vehicle door and thus represents one unit which can be pre-tested and prefitted. The quality and efficiency of the door assembly can hereby be improved. A further rationalizing effect is produced through the simultaneous manufacture of the support plate and door inside trim in one tool (more particularly injection moulding tool).

BRIEF DESCRIPTION OF THE DRAWINGS

The invention will now be explained in further detail with reference to the embodiment shown in the drawings in which.

DETAILED DESCRIPTION

Figure 1:
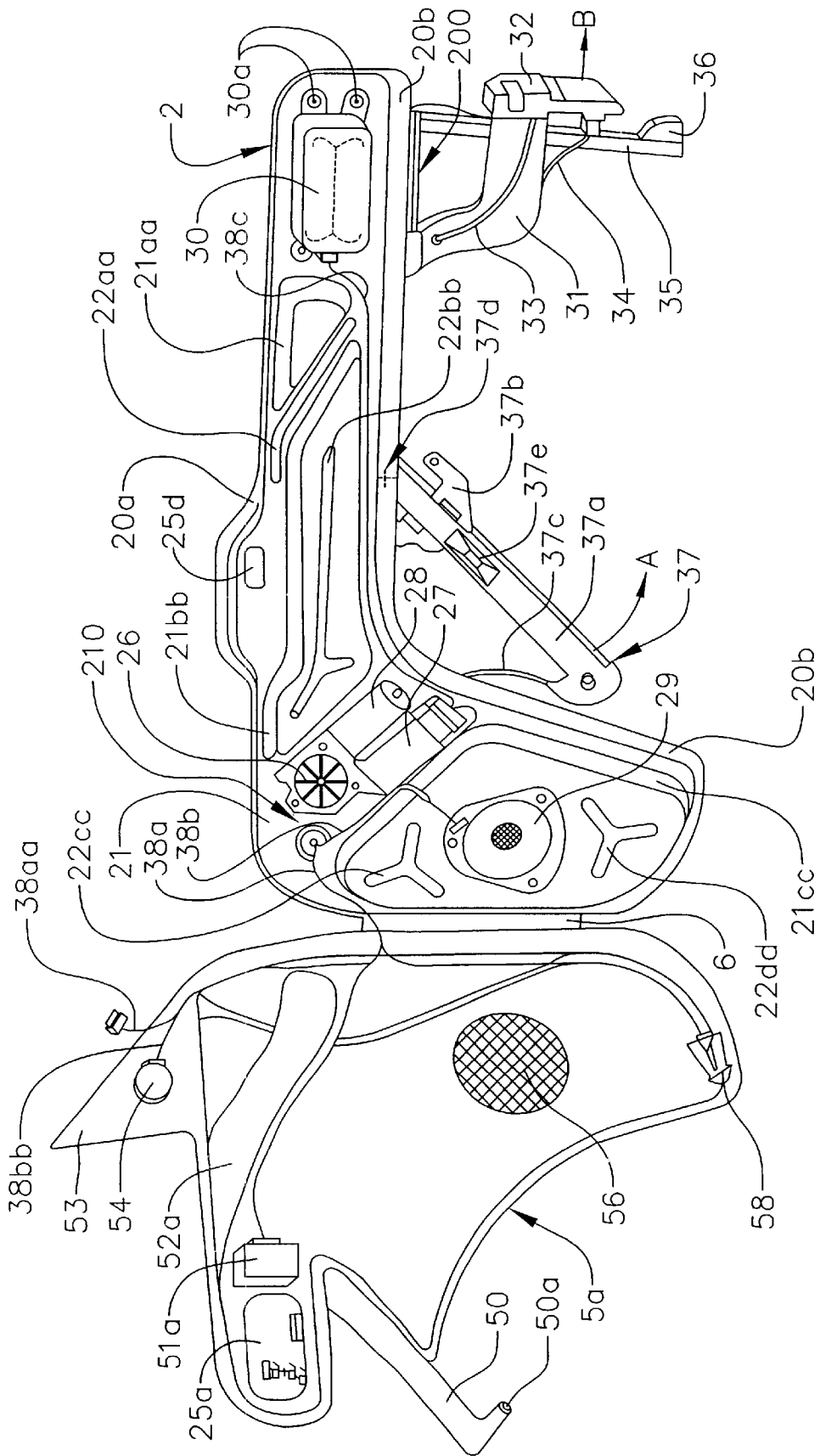
FIG. 1 is a view of a dry cell side of a support plate, and a view of a door-facing side of a part of a door inside trim connected integral with the support plate and fitted with several function units.

According to the embodiment of FIG. 1 (see also FIG. 4), a support plate 2 is provided which covers a part of a cut-out section 101 in an inner door panel 11. A part 5a of the door inside trim is connected by a film hinge 6 to the support plate 2. The part 5a covers a part of the support plate 2 and leaves a free area which is sufficient for fitting a window lifter 37 and a lock 32.

FIG. 1 shows the two parts 2 and 5a which are connected together in one piece (or component part) by the hinge 6 in the "opened" state, thus as they were removed from the tool. Where the blow moulding technique is chosen as the manufacturing process, wherein the desired product is formed on the basis of a tubular foundation body of thermoplastic material by applying heat and compressed air in a moulding tool, the hinge area is formed as a film hinge 6 where the two walls of the blow moulded part are connected together and slightly weakened where appropriate. If the one-piece component part is however made by injection moulding plastic, then the hinge area 6 can also be formed by separate elements which are to be inserted into the injection tool. Fabric inserts or articulated connections are particularly suited for this.

If an edge area 20a of the support plate 2 is associated with an edge area of the cut-out section 101 of the inner door panel 11, then this overlapping produces a sufficiently good seal. This can be reached, for example, by a suitable sealing element which is mounted in the edge area 20a on the wet cell side of the support plate. The remaining area of the cut-out section 101 which adjoins an edge area 20b of the support plate can advantageously be covered by a matching sized ready-made cover foil (not shown) which saves material and weight. An adhesive agent or means for positive-locking or clamp fixing can be used to fix the cover foil in the edge area 20b of the support plate 2 as well as in the edge area (not covered by the support plate 2) of the cut-out section 101 of the inner door panel 11.

The following description is restricted to a component part produced as a blow moulded part, since this variation is regarded as particularly advantageous. This comparatively cost-effective method allows the support plate 2 to be designed in various shapes adapted to the relevant individual requirements whereby one double-walled element is always produced in one work step. At the same time, large surface connecting areas 21 and linear or spot-form connecting sites 21aa, 21bb, 21cc can be produced in order to produce there through openings (apertures), fastening openings, individually demarcated or accurately defined hollow cavities or to create an improvement in the dimensional stability of the support plate 2.

Figure 3:
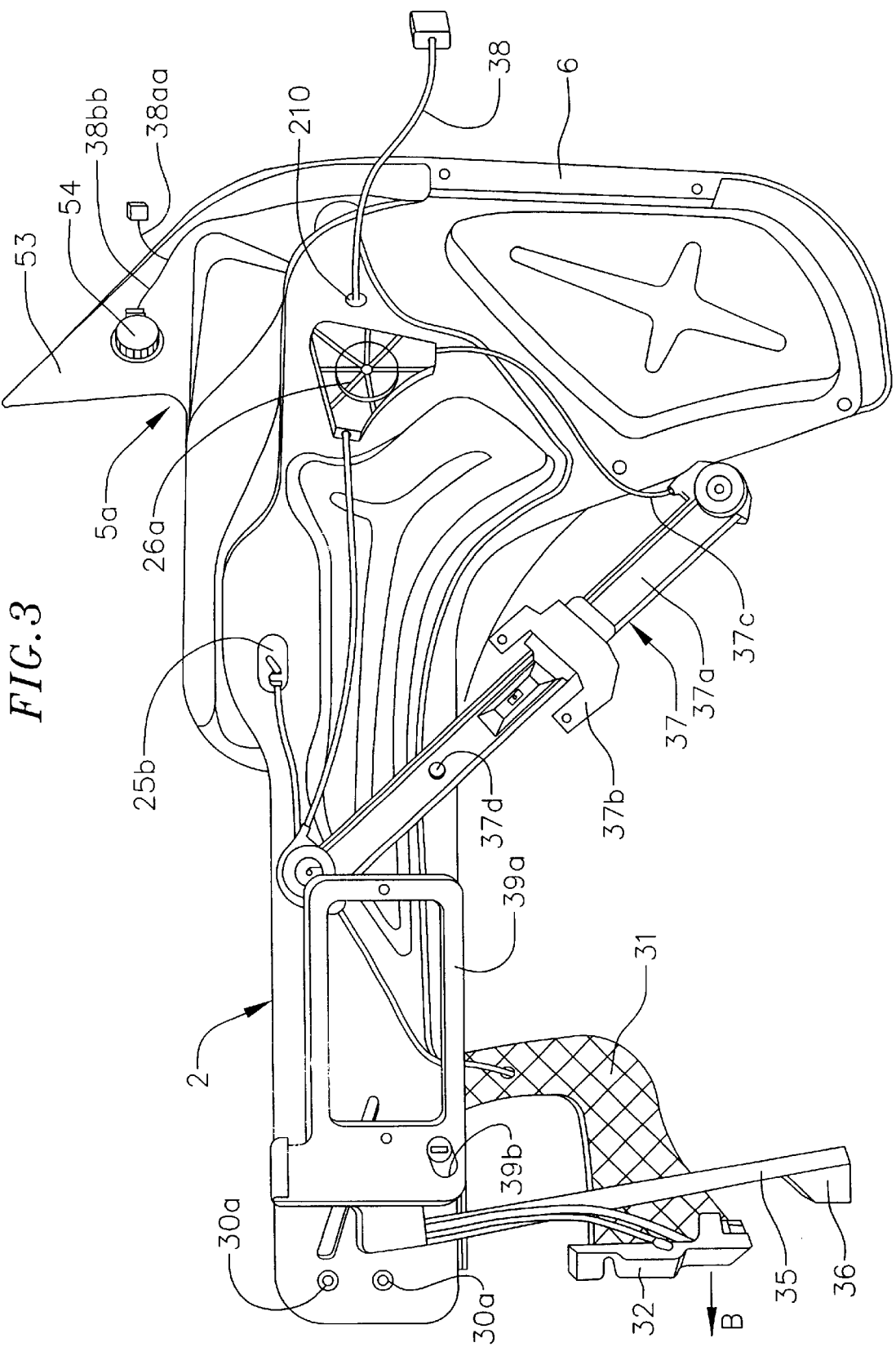
FIG. 3 shows the wet cell side of the support plate.

The illustrated embodiment of the support plate 2, whose wet-cell side is shown in FIG. 3, has in conjunction with the door inside trim 5a a very high specification of function components so that when assembling the door as little work as possible need be carried out. This unit which is made up of support plate 2 and door inside trim 5a represents one pre-checkable module having a high degree of integration which allows an improvement in the efficiency of the door production and lowers the risk of faults occurring.

The support plate 2 and the door inside trim 5a have differently shaped areas depending on the technical requirements and demands on the vehicle door 1. In order to seal the wet cell which lies between the support plate 2 and the outer door panel 10, the support plate 2 has a circumferential edge area 20a, 20b in which the two walls 2a, 2b lie one on top of the other. An additional three circumferential linear connecting sites 21aa, 21bb, 21cc set closed within the edge area 20a, 20b include separate hollow cavities whose walls are stabilized by swage-like reinforcements 22bb, 22cc, 22dd.

One of the hollow cavities, which is defined by the connecting site 21cc, functions as a resonance chamber for a speaker 29. The one of the hollow cavities is adapted in size exactly to the speaker 29 used in order to obtain the best possible sound results. At the top of the support plate there is a relatively large connecting area 21 which forms a type of indentation between the two hollow cavities which are defined by the connecting sites 21bb and 21cc. In this indentation is housed a drive and control unit which consists of a motor 28, a gearing 26 and an electronics unit 27, and whose output shaft is in active connection with a cable drum 26a with housing. The drive force is passed through a cable guided in a Bowden tube 37c of a Bowden window lifter 37 along guides at ends of guide rails 37a up to a follower 37b which is mounted displaceable on the guide rail 37a and is connectable to a lower edge of a window pane.

Figure 2:
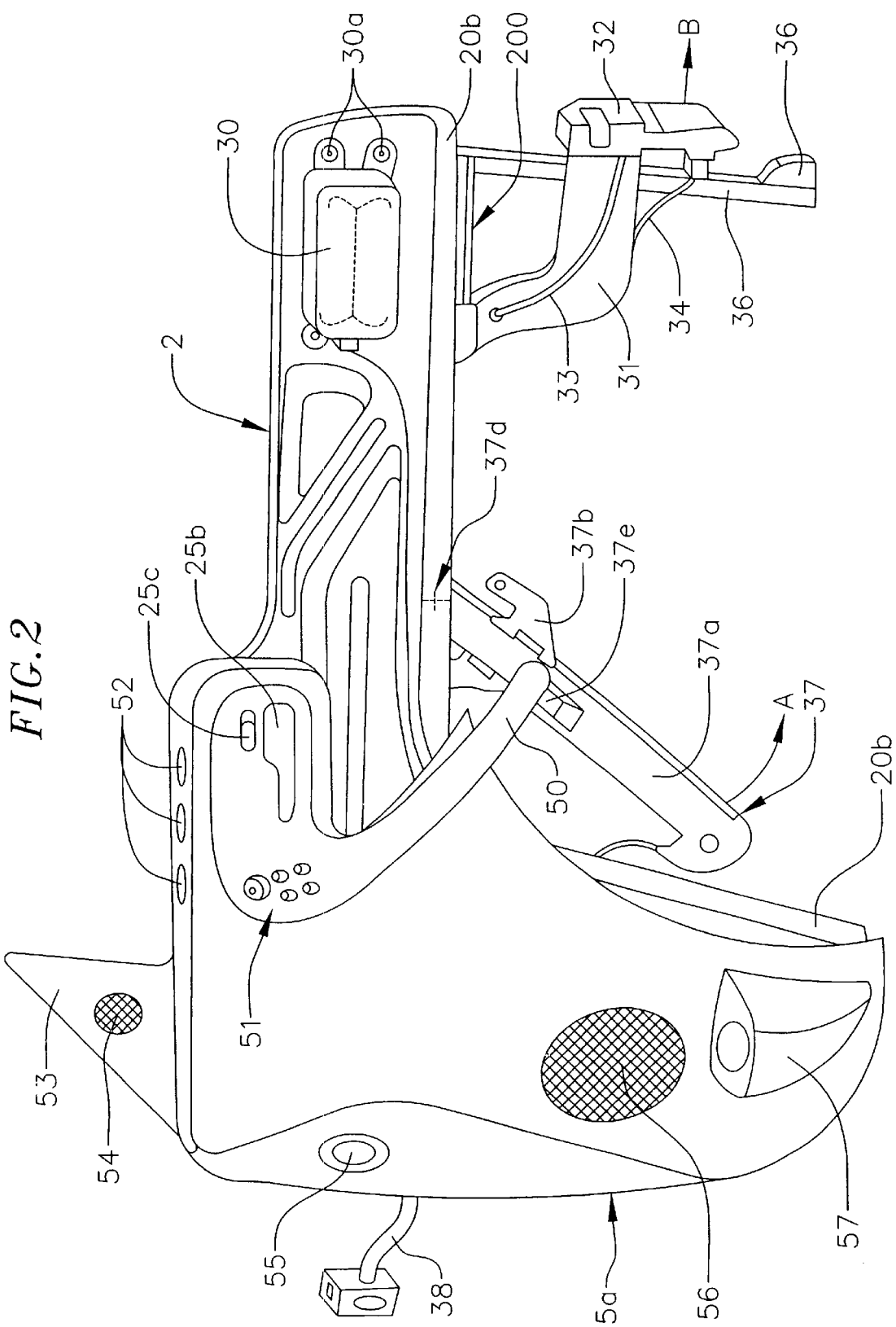
FIG. 2 shows the one-piece unit of the support plate and the door inside trim according to FIG. 1, but after folding the support plate and the door inside trim together about the connecting hinge.

According to the illustrations of FIGS. 1 to 3, the guide rail 37a of the Bowden window lifter 37 is located in an inclined transport position and is able to swivel into its operating position about a swivel axis 37d in the direction of arrow A. The bolt of the swivel axis 37b is preferably formed in one piece on the support plate 2. The Bowden window lifter is fixed in the door body by screws which are guided through the axes of the cable guides (more particularly cable rollers). Stresses on the support plate 2 are thereby avoided.

A through opening 210 is also provided in the connecting area 21 through which cables 38a, 38b are guided and sealed against dampness. While the cable 38b serves to power and control the electronics unit 27 of the electric motor 28, the cable 38a connects an outside mirror, a tweeter mounted in an upper area of the door inside trim 5a, a switch block 51a for controlling the window lifter and outside mirror, and also a floor light 58. Furthermore a grab handle (or handle shell) 25a, a speaker cover 56 for the speaker 29 and an air duct 52a for ventilating the windows are all integrated in the door inside trim 5a.

As can be seen from FIGS. 1 and 2, the air duct 52a ends on one side in the region of the dashboard support (not shown) in an air inlet and on the other side in air nozzles 52. Also visible are the switches 51 belonging to the switch block 51a as well as an inside door opener (operating element) 25b and a locking button 25c (operating element) which are mounted in the handle shell 25a. Elements for transferring force or transferring setting movements (e.g. Bowden cables or rod linkages) as well as cables are guided on the wet cell side of the support plate 2 and connect the operating elements 25b, 25c to a lock 32. The lock 32 is also shown in its transport position and is fixed on a lock holder 31 which is mounted displaceable on a rail 200 integrated in the edge area of the support plate 2. After fitting the support plate 2 in the door body, the lock 32 is pushed into its function position and locked there.

Figure 4:
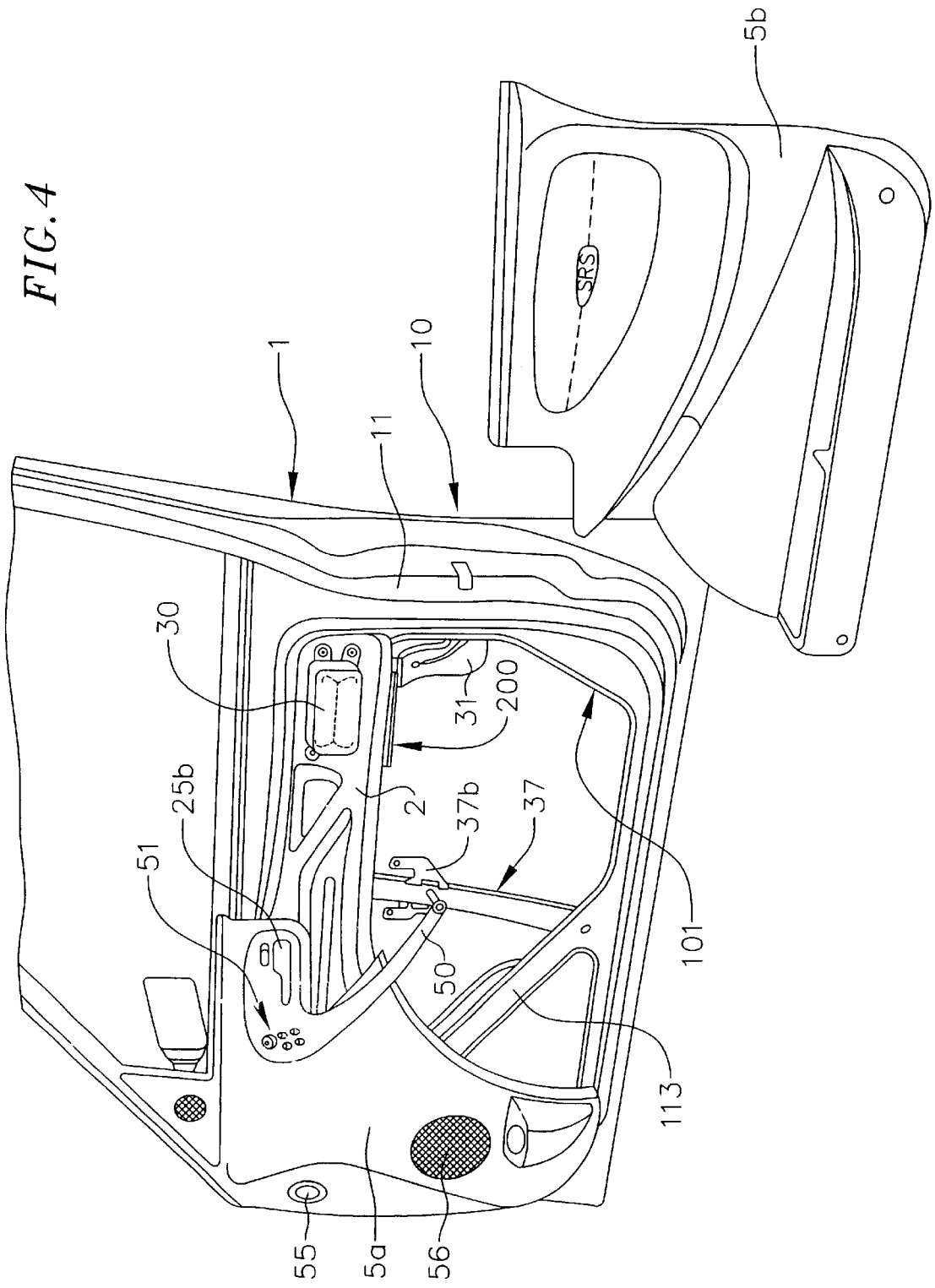
FIG. 4 shows a view of the inside of the vehicle door after installation of the unit, comprising the support plate and the door inside trim, into a door body.

The position of the support plate 2 and the door inside trim 5a, shown in FIG. 2 where they are folded together, corresponds to the transport and delivery position. After fitting the module into a vehicle door, the window lifter 37 and the lock holder 31 are located in their operating positions, as shown in FIG. 4. A fastening area 37e is provided on the guide rail 37a of the window lifter 37 and is connected to an end 50a of a grab handle 50.

An outside door handle holder plate 39a is mounted on the wet cell side of the support plate 2 and is connected to the lock holder 31 through the guide rail 35 for the window pane as shown in FIG. 3. The outside door handle holder is thus held displaceable in the direction B. A lock cylinder 39b is prefitted on the outside door handle holder plate 39a. After installing the support plate 2 and fixing the lock 32, the outside door holder plate 39a is fixed on the outside door panel 1. The outside handle can then be inserted with the dish (or grab handle) 25a. It is, however, fundamentally also possible to likewise prefit the outside handle on the holder plate 39a.

The support plate 2 is preferably fixed on an inside door panel 11 by screws in the overlapping edge areas. If a side airbag is to be provided then its fastening sites 30a can also serve at the same time for fixing with the support plate 2 in this area, wherein it is possible to prefit the side airbag 30 through simple clips. In order to safely sustain the reaction forces of the side airbag 30 even where the support plate 2 has little stability, a corner area of the inside door panel 11, preferably provided with reinforcement swages, is to be passed behind the side airbag 30.

At this point it should be pointed out that the one-piece component part according to the invention can also comprise a support plate and/or a door inside trim which covers an entire cut-out section 101 of the inner door panel 11. The pre-requisites for this are given, for example, if the support plate and door inside trim are supplied for assembly in the "unfolded" position; and/or; the window pane and lock can be assembled through so-called "blind fitting"; and/or local assembly openings, which can be closed by suitable elements, are provided in the support plate and where necessary in the door inside trim.

Figure 5:
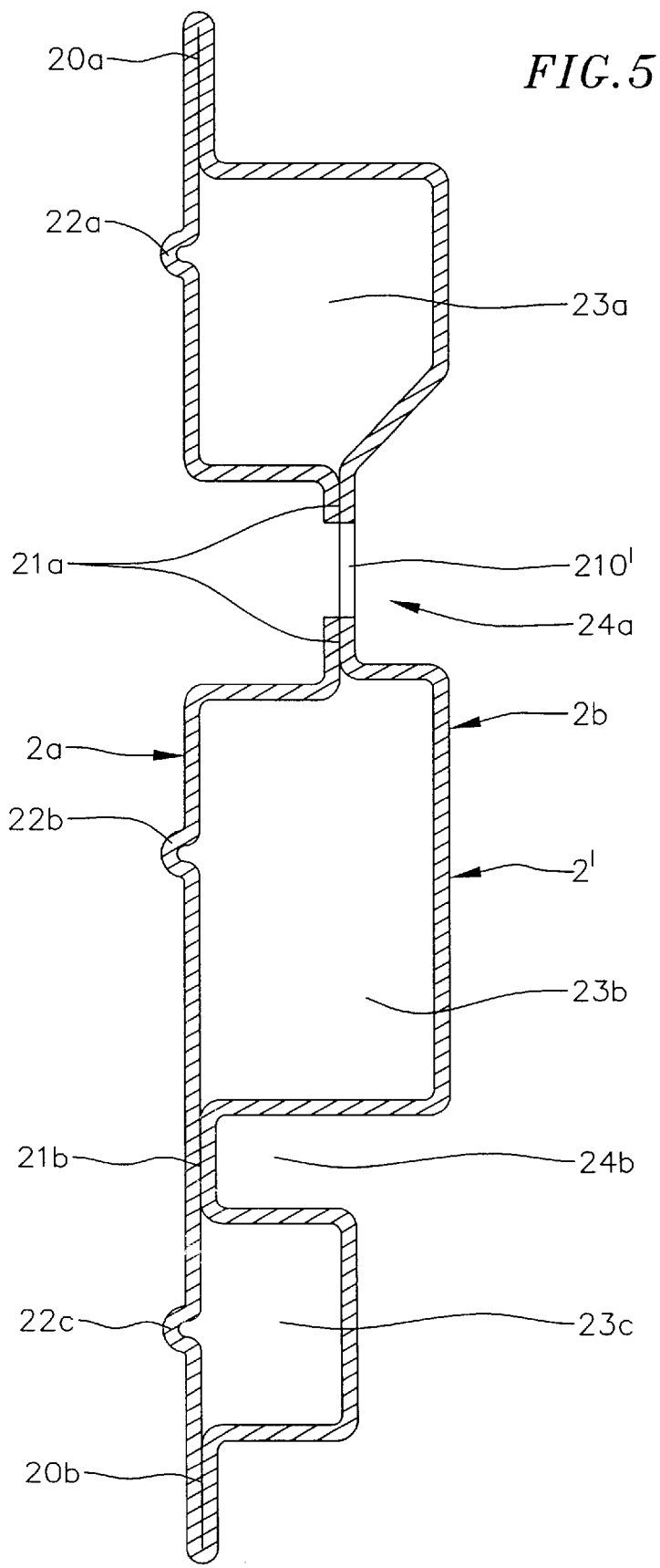
FIG. 5 shows a cross-sectional view through a support plate with several cavities, reinforcements and an aperture.

Using FIG. 5 which shows in diagrammatic form a sectional view through an imaginary support plate 2', reference will now be made to some essential features and design possibilities of the blow moulding technique.

Analogous with the support plate 2 previously described the walls 2a, 2b lie one on top of the other in the edge areas 20a, 20b and thus form ideal surfaces for applying cover foils or fastening holes. The part 2' has three separate hollow cavities 23a, 23b, 23c which are separated from each other by connecting sites 21a, 21b. In one of the connecting sites 21a a through opening (or aperture) 210' was provided suitable for passing through a drive axle, operating rod or cables. The indentations 24a, 24b lying between the hollow cavities 23a, 23b 23c can hold function units such as for example motors, electronics, airbag or the like, or they can be used to guide force-transferring component parts such as rod linkages or Bowden cables. Swages 22a, 22b, 22c can be shaped into the wall 2a to provide reinforcement.

Figure 6:
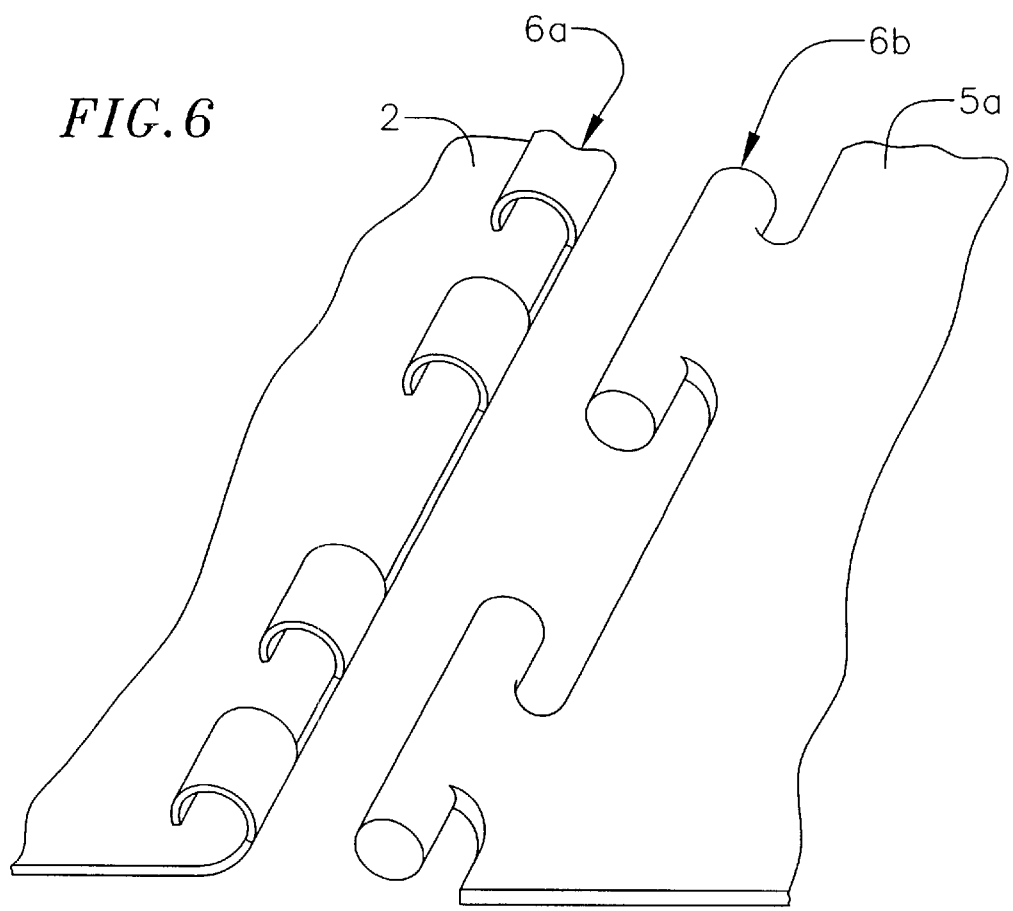
FIG. 6 shows separate hinge areas which are moulded on the support plate and/or the door inside trim.
Figure 7:
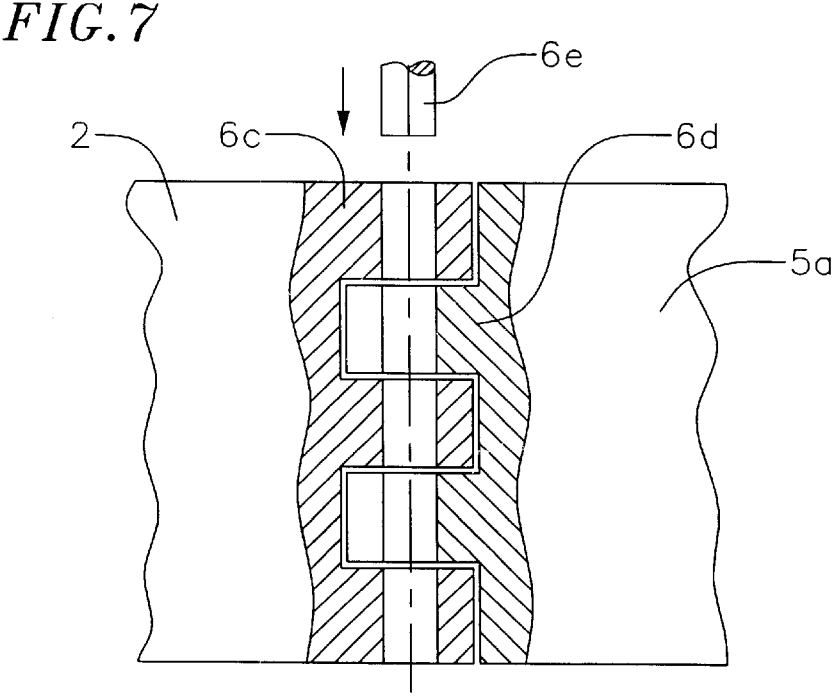
FIG. 7 shows hinge areas which are connected together by a separate hinge axis.

FIGS. 6 and 7 show further examples for designing hinge areas for a modular unit of support plate 2 and door inside trim 5a. These each concern rotary hinges which are made up of separate hinge areas provided on the support plate 2 on one side and on the part 5a of the door inside trim 5 on the other. Such rotary hinges can be formed in one tool (more particularly an injection moulding tool) with the simultaneous production of the support plate and part of the door inside trim, wherein the two hinge areas are still connected together at first after removing the modular unit from the tool. The two hinge areas are then separated by breaking off the corresponding connecting spots so that two separate hinge areas are formed which allow the door inside trim to rotate freely relative to the support plate.

The two hinge areas 6a, 6b shown in FIG. 6 are particularly suitable for connecting together the folding support plate and door inside trim when these are not made from the same material. The hinge areas 6a, 6b can thereby be designed like clips so that the door inside trim and the support plate can be separated from each other when necessary.

The hinge areas 6c, 6d shown in FIG. 7 are identical in design and consist of several eyelets arranged comb-like. To connect the two hinge areas 6c, 6d, a separate hinge axis 6e is used which engages through the eyelets of the hinge areas 6c, 6d and which can be inserted as a separate component part into the injection moulding tool in which the support plate and the associated part of the door inside trim are made.

What is claimed is:

1. A motor vehicle door for a vehicle comprising:
   an outer door panel;
   an inner door panel with a cut-out section;
   a support plate which supports at least one of mechanical and electrical components and covers at least part of the cut-out section;
   a door inside trim facing an interior of the vehicle;
   a connecting area that connects together the support plate and at least one part of the door inside trim so that they can be folded together; and
   wherein the support plate, the at least one part of the door inside trim and the connecting area are a continuous one-piece part.

2. The motor vehicle door according to claim 1 wherein the support plate and the at least one part of the door inside trim are made at least in part of plastic.

3. The motor vehicle door according to claim 1 wherein the support plate is connected to a hinge, which in turn is connected to the at least one part of the door inside trim.

4. The motor vehicle door according to claim 3 wherein the hinge is a film hinge.

5. The motor vehicle door according to claim 3 wherein the hinge is a rotary hinge.

6. The motor vehicle door according to claim 1 wherein the support plate and the at least one part of the door inside trim are formed as injection moulded parts.

7. The motor vehicle door according to claim 1 wherein the support plate and the at least one part of the door inside trim are formed as a blow moulded part on a basis of a tubular foundation body.

8. The motor vehicle door according to claim 1 wherein the support plate and the at least one part of the door inside trim are formed as one integral structural unit.

9. The motor vehicle door according to claim 1 wherein the connecting area is formed as an articulated wall and is injection moulded into an edge area of the support plate and the at least one part of the door inside trim.

10. The motor vehicle door according to claim 1 wherein the connecting area is a fabric part connected to the edge areas of the support plate and the at least one part of the door inside trim.

11. The motor vehicle door according to claim 1 wherein the support plate and the at least one part of the inside door trim are made from different materials.

12. The motor vehicle door according to claim 1 wherein after folding the at least one part of the door inside trim together with the support plate, areas in the support plate, upon which assembly work is to be completed, remain accessible.

13. The motor vehicle door according to claim 1 further comprising a guide rail mounted in the door for a window lifter and the guide rail has a fastening point for an end of a door handle.

14. The motor vehicle door according to claim 1 further comprising a guide rail mounted in the door for a window lifter and the guide rail has a fastening point for an end of a door handle.

15. A motor vehicle door for a vehicle comprising:
an outer door panel;
an inner door panel with a cut-out section;
a support plate which supports at least one of mechanical and electrical components and covers at least part of the cut-out section;
a door inside trim facing an interior of the vehicle;
a connecting area that connects together the support plate and at least one part of the door inside trim so that they can be folded together; and
wherein the support plate, the at least one part of the door inside trim and the connecting area are made together in one tool as one structural unit, and wherein the support plate and the at least one part of the door inside trim are connected together through a rotary hinge, and wherein the rotary hinge has a hinge area on the support plate and a separate hinge area on the at least one part of the door inside trim.

16. The motor vehicle door according to claim 15 wherein the two hinge areas are made in one tool together with the support plate and the at least one part of the door inside trim as one integral unit, wherein the one integral unit is capable of being separated by breaking the connecting area such that the two hinge areas are separate.

17. The motor vehicle door according to claim 15 wherein the at least one part of the door inside trim is connectable to the support plate through detent elements moulded on at least one of the support plate and the at least one part of the door inside trim.

18. The motor vehicle door according to claim 17 wherein a connection between the at least one part of the door inside trim and the support plate is releasable through the detent elements.

19. The motor vehicle door according to claim 15 wherein the at least one part of the door inside trim, and the support plate are provided with associated electrical contacts, such that when the at least one part of the door inside trim and the support plate are rotated together to contact each other, an electrical contact occurs, guaranteeing a transfer of at least one of electrical signals and electric drive energy.

20. The motor vehicle door according to claim 15 wherein the rotary hinge connects together the support plate and at least one part of the door inside trim, and permits the support plate and at least one part of the door inside trim to be moved between first and second positions, wherein in the first position the at least one part of the door inside trim is positioned away from the support plate to expose a portion of the support plate, and in the second position the support plate and at least one part of the door inside trim are folded together.

21. The motor vehicle door according to claim 20 wherein in the first position the support plate is substantially completely exposed such that each of the at least one of mechanical and electrical components for a vehicle door is accessible.

22. A motor vehicle door for a vehicle comprising:
an outer door panel;
an inner door panel with a cut-out section;
a support plate which supports at least one of mechanical and electrical components and covers at least part of the cut-out section;
a door inside trim facing an interior of the vehicle;
a connecting area that connects together the support plate and at least one part of the door inside trim so that they can be folded together; and
wherein the support plate, the at least one part of the door inside trim and the connecting area are made together in one tool as one structural unit, and wherein the at least one part of the door inside trim is connectable to the support plate through detent elements moulded on at least one of the support plate and the at least one part of the door inside trim.

23. The motor vehicle door according to claim 22 wherein a connection in the connecting area between the at least one part of the door inside trim and the support plate is releasable through the detent elements.

24. A motor vehicle door for a vehicle comprising:
an outer door panel;
an inner door panel with a cut-out section;
a support plate which supports at least one of mechanical and electrical components and covers at least part of the cut-out section;
a door inside trim facing an interior of the vehicle;
a connecting area that connects together the support plate and at least one part of the door inside trim so that they can be folded together; and
wherein the support plate, the at least one part of the door inside trim and the connecting area are made together in one tool as one structural unit, and wherein the at least one part of the door inside trim, and the support plate are provided with associated electrical contacts, wherein after folding together the at least one part of the door inside trim and the support plate the associated electrical contacts guarantee transfer of at least one of electrical signals and electric drive energy.

25. A support plate assembly comprising:

a support plate to support at least one of mechanical and electrical components for a vehicle door;

a door inside trim; and a connecting area that connects-together the support plate and at least one part, of the door inside trim, and that permits the support plate and at least one part of the door inside trim to be moved between first and second positions, wherein in the first position the at least one part of the door inside trim is positioned away from the support plate to expose a portion of the support plate, and in the second position the support plate and at least one part of the door inside trim are folded together.

26. The support plate assembly of claim 25 wherein in the first position the support plate is substantially completely exposed such that each of the at least one of mechanical and electrical components for a vehicle door is accessible.

* * * * *

UNITED STATES PATENT AND TRADEMARK OFFICE
CERTIFICATE OF CORRECTION

PATENT NO.    : 6,438,899 B1
DATED         : August 27, 2002
INVENTOR(S)   : Roland Feder et al.

It is certified that error appears in the above-identified patent and that said Letters Patent is hereby corrected as shown below:

Title page,
Item [73], Assignee, replace "Brose Fahrzeugteile GmbH & Co. KG, Coburg (DE)" with -- Brose Fahrzeugteile GmbH & Co., KG, Coburg, Coburg (DE) --.

Column 7,
Lines 34-37, replace "The motor vehicle door according to claim 1 further comprising a guide rail mounted in the door for a window lifter and the guide rail has a fastening point for an end of a door handle." with -- The motor vehicle door according to claim 1 wherein the door inside trim has cut-out sections in areas allowing accessibility for assembly work. --.

Column 9,
Line 9, replace "connects-together" with -- connects together --.
Line 10, replace "part, of the door inside trim" with -- part of the door inside trim --.

Signed and Sealed this

Fifteenth Day of July, 2003

JAMES E. ROGAN
*Director of the United States Patent and Trademark Office*